United States Patent
Ananikian et al.

(10) Patent No.: US 6,266,403 B1
(45) Date of Patent: Jul. 24, 2001

(54) TELECOMMUNICATION DEVICE

(75) Inventors: Daniel Ananikian, Strasbourg;
Jean-Marc Gomes, Illkirch;
Emmanuel Pellegrini, Offenheim, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/139,468

(22) Filed: Aug. 25, 1998

(30) Foreign Application Priority Data

Aug. 25, 1997 (EP) .................................... 97440070

(51) Int. Cl.$^7$ .................................... H04M 1/56
(52) U.S. Cl. .................................... 379/142
(58) Field of Search .................................... 379/382, 142, 379/372, 377, 157, 160, 161, 164, 166, 167, 171, 177, 178, 179, 183, 184

(56) References Cited

U.S. PATENT DOCUMENTS

| | | | |
|---|---|---|---|
| 4,324,953 | * | 4/1982 | Simokat ................................ 379/142 |
| 4,924,496 | | 5/1990 | Figa et al. ............................ 379/142 |
| 5,218,635 | * | 6/1993 | Bonvallet et al. .................... 379/382 |
| 5,388,150 | | 2/1995 | Schneyer et al. ....................... 379/67 |
| 5,396,548 | | 3/1995 | Bayerl et al. ......................... 379/140 |
| 5,422,939 | * | 6/1995 | Kramer et al. ........................ 379/377 |
| 5,425,089 | * | 6/1995 | Chan et al. . |
| 5,446,785 | * | 8/1995 | Hirai ................................... 379/142 |
| 5,535,265 | | 7/1996 | Suwandhaputra . |
| 5,592,529 | * | 1/1997 | Linkre ................................. 379/142 |
| 5,596,631 | * | 1/1997 | Chen ................................... 379/157 |
| 5,734,712 | * | 3/1998 | Randahl .............................. 379/382 |
| 5,790,653 | * | 8/1998 | Fairbanks et al. ................... 379/372 |
| 5,838,777 | * | 11/1998 | Chang et al. ........................ 379/142 |
| 5,898,756 | * | 4/1999 | Manning et al. .................... 379/167 |
| 6,075,845 | * | 6/2000 | Gizara et al. ..................... 379/93.08 |

FOREIGN PATENT DOCUMENTS

| | | |
|---|---|---|
| 2727271 | 5/1996 | (FR) . |
| 2279203 | 12/1994 | (GB) . |
| 9514344 | 5/1995 | (WO) . |
| 9728631 | 8/1997 | (WO) . |

* cited by examiner

Primary Examiner—Curtis Kuntz
Assistant Examiner—Rexford N Barnie

(57) ABSTRACT

Known telecommunication devices, like a telephone device or a facsimile apparatus or a separate unit for displaying the caller's number to the person to be called, for providing calling line identification in response to an identification signal transmitted between two rings of a ringing signal, are not sufficiently user friendly. By providing said telecommunication device with a detector for detecting an incoming call already being answered, at an other time a regular user was not present or via an other telephone situated at an other location but coupled to the same line in a parallel way, which information preferably will be stored and displayed, the device becomes more user friendly.

20 Claims, 1 Drawing Sheet

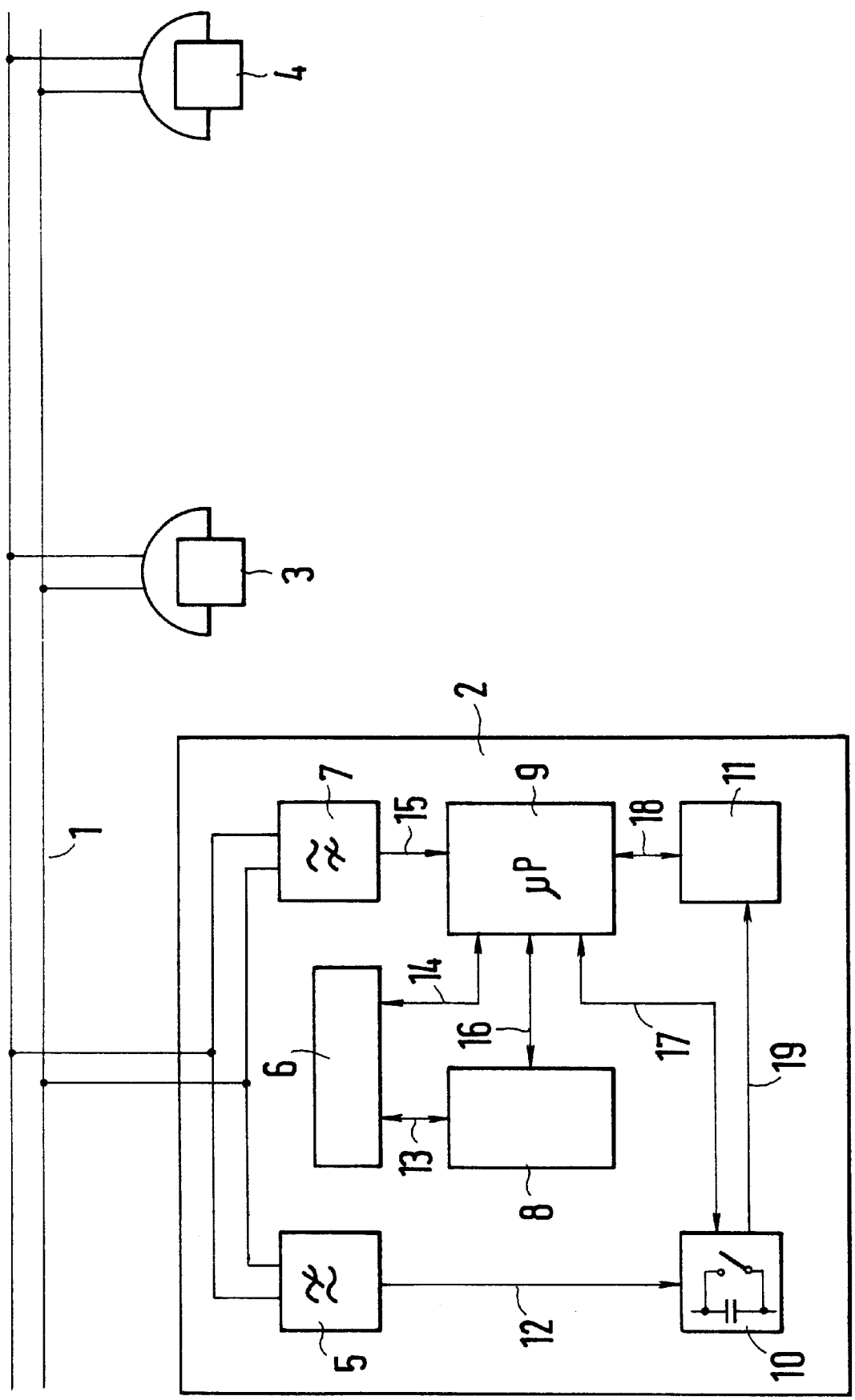

TELECOMMUNICATION DEVICE

BACKGROUND OF THE INVENTION

1. Technical Field

The invention relates to a telecommunication device comprising an input for receiving a signalling signal comprising a ringing signal and an identification signal, and a detector coupled to said input for detecting said signalling signal.

2. Discussion of Related Art

Such a telecommunication device, like a telephone device or a facsimile apparatus or a separate unit for displaying the caller's number to the person to be called, is for example known from FR 2727271, which discloses an analog telecommunication system, in which an identification signal with identification information of a caller is transmitted between the first and the second ring of a ringing signal to the telecommunication device of the person to be called. This telecommunication device comprises a detector for detecting a signalling signal comprising said ringing signal and said identification signal.

The disclosed telecommunication device is disadvantageous, inter alia, because of being designed for a testing environment, and therefore being insufficiently friendly to users.

SUMMARY OF INVENTION

It is an object of the invention, inter alia, to provide a telecommunication device as described in the preamble which is more friendly to users.

Thereto the telecommunication device according to the invention is characterized in that said telecommunication device comprises a further detector coupled to said input for detecting a response to said signalling signal.

By providing the telecommunication device according to the invention with said further detector for detecting an incoming call (associated with said signalling signal) being responded or not (for example by an other person at a time a user was not present or via an other telephone situated at an other location but coupled to the same line), a user of said telecommunication device can get information about said call being responded or not, which makes the device more user friendly.

The invention is based on the insight, inter alia, that a user of the telecommunication device according to the invention should have the possibility of being informed of an other person already having responded to an incoming call at an other time the user was not present or via an other telephone situated at an other location but coupled to the same line.

The problem of a known telecommunication device being insufficiently user friendly is thus solved by providing it with said further detector.

At least a part of the inventivity of said solution is situated is the observation that a detection of somebody else having responded to an incoming call (at an other time a regular user was not present or via an other telephone situated at an other location but coupled to the same line) could be interesting information to said regular user of said device.

The telecommunication device according to the invention offers the possibility of introducing calling line identification for analog subscribers in a user friendly way, which is very advantageous.

A first embodiment of the telecommunication device according to the invention is characterized in that said response originates from a telephone coupled to said input in a parallel way.

By allowing many telephones to be coupled in parallel, which is often done in houses, each incoming call can be responded from each one of said telephones.

Said device will then show the numbers of the (most recent) callers and whether or not each one of these calls has been answered.

A second embodiment of the telecommunication device according to the invention is characterized in that said response comprises a voltage-drop due to an off-hook situation.

Each off-hook situation as a consequence of a handset being picked up corresponds to said telephone line being connected to a load, resulting in said voltage-drop. Due to the device according to the invention (like a telephone device or a facsimile apparatus or a separate unit for displaying the caller's number to the person to be called) being in parallel with at least one (other) telephone, such a voltage-drop is easier to detect than a current starting to flow.

A third embodiment of the telecommunication device according to the invention is characterized in that said further detector comprises a capacitor.

Said capacitor not only can be charged easily with the charge being dependent upon the presence or absence of a voltage-drop during the ringing signal, but also has got a memory function allowing the device to make a decision.

A fourth embodiment of the telecommunication device according to the invention is characterized in that said further detector comprises a threshold establisher coupled to said capacitor for establishing a threshold.

Said threshold establisher allows the establishment of said charge in this case being a voltage which will be higher when said voltage-drop has not been there and which will be lower when said voltage-drop has happened.

A fifth embodiment of the telecommunication device according to the invention is characterized in that said further detector comprises a time measurer coupled to said threshold establisher for measuring a time interval for said capacitor being charged up to said threshold.

The use of such a time measurer allows the use of a simple and cheap voltage establisher due to the fact that the threshold to be reached will always be the same, whereby the time interval that the capacitor needs to be charged up to the threshold determines whether or not an incoming call has been answered.

A sixth embodiment of the telecommunication device according to the invention is characterized in that said telecommunication device comprises a memory coupled to said detector and to said further detector for storing said identification signal and said response.

Such a device discloses much user friendliness due to the storage of a combination of identification signal and response, possibly to be extended with a storage of response-time and/or response-location (which telephone was used for responding).

A seventh embodiment of the telecommunication device according to the invention is characterized in that said telecommunication device comprises a display coupled to said memory for displaying said identification signal and said response.

Such a device discloses most user friendliness due to the possibility of displaying said combination of identification signal and response, possibly to be extended with displaying said response-time and/or response-location.

Neither from FR 2727271, which discloses an analog telecommunication system, in which an identification signal with identification information of a caller is transmitted between the first and the second ring of a ringing signal to the telecommunication device of the person to be called, nor from GB 2279203, which discloses a calling party identification apparatus, is it known to detect an incoming call already being answered, and to store and/or display said feature.

These and other objects, features and advantages of the present invention will become more apparent in light of the detailed description of a best mode embodiment thereof, as illustrated in the accompanying drawing.

BRIEF DESCRIPTION OF THE DRAWING

The sole FIGURE discloses an embodiment of a telecommunication device according to the invention.

DETAILED DESCRIPTION OF PREFERRED EMBODIMENTS

In the FIGURE a telephone line 1 comprising two wires is coupled to an in/output of the telecommunication device 2 according to the invention and to a telephone apparatus 3 and to a telephone apparatus 4. Telecommunication device 2 comprises a low-pass filter 5 coupled to said telephone line 1 and a high-pass filter 7 coupled to said telephone line 1. An output of high-pass filter 6 is coupled via a connection 15 to an input of a processor 9 functioning as a detector. A first in/output of processor 9 is coupled via a connection 14 to a first in/output of a memory 6, of which a second in/output is coupled via a connection 13 to a first in/output of a display 8, of which a second in/output is coupled via a connection 16 to a second in/output of processor 9. A third in/output of processor 9 is coupled via a connection 17 to a first in/output of a further detector 10, of which an input is coupled via a connection 12 to an output of low-pass filter 5 and of which a second in/output is coupled via a connection 19 to an input of a threshold establisher 11, of which a first in/output is coupled on a line 18 to a fourth in/output of processor 9.

The telecommunication device 2 as disclosed in FIG. 1 functions as follows. In case of telephone line 1 being an analog line, so-called calling line identification (the provision of the number of the caller to the person to be called) can be provided by transmitting identification information of the caller for example during a silence of the ringing signal between for example the first and the second ring of said ringing signal to the person to be called, for example a regular user of telephone 3. Near said telephone 3 the telecommunication device 2 will be located, which displays said identification information via display 8. Because of said identification information being a modem signal, it will pass high-pass filter 7 and arrive at processor 9, which processes said information for being displayed, thereby using memory 6 for storing said information and/or converting said information and/or adding further information to said information.

In case said regular user of telephone 3 has been away for a while, a problem might arise, due to said telecommunication device 2 displaying for example a number of a caller who has called telephone 3 during the absence of said regular user, without said regular user knowing whether or not somebody else already has answered this call via telephone 3 or possibly via telephone 4 located in an other room. This problem is solved by providing said telecommunication device 2 with further detector 10, inter alia, which receives a dc-voltage as present on said telephone line 1 during each silence of said ringing signal (each ring corresponds to an ac-voltage added to said dc-voltage). Said dc-voltage is used for charging a capacitor of further detector 10, which charge is compared with a threshold generated by threshold establisher 11, for example by using a combination of a transistor and one or more diodes, said transistor becoming conductive as soon as said threshold has been reached and until that moment being non-conductive. As soon as said threshold has been reached, processor 9 is informed, resulting in processor 9 establishing a time-interval during which said capacitor was charged. At regular moments (like for example every 20 msec. or every 60 msec.), processor 9 will discharge said capacitor, for example by closing a switch situated in parallel with said capacitor, said switch then preferably being in series with a resistor to limit a discharge-current. In case a call is answered, due to an off-hook situation at telephone 3 or 4, there will be a voltage-drop in said dc-voltage at said telephone line 1, resulting in said capacitor needing more time (like for example 10% or 50% or 100%) to be charged up to said threshold. Processor 9 will establish the time-interval being increased, and will conclude that said call has been answered.

In case said regular user of telephone 3 has been away for a while, with said telecommunication device 2 displaying for example a number of a caller who has called telephone 3 during the absence of said regular user, and somebody else already has answered this call via telephone 3 or possibly via telephone 4 located in an other room, without said regular user knowing this, said problem does not arise anymore, due to display 8 for example now either displaying both the number of the caller and a signal indicating that said call has been answered (in other words indicating a response), or for example now not displaying anything at all with respect to said call.

Of course, further options should not be excluded, like for example displaying said combination of identification signal and response, possibly to be extended with displaying a response-time (by for example using a clock signal of a clock located inside telecommunication device 2) and/or a response-location (by for example using a code signal originating from the telephone that was used for off-hooking).

Although in FIG. 1 said telecommunication device 2 is a separate unit situated next to telephone 3, with telephone 4 being at an other location, it is also possible to integrate said telecommunication device 2 and telephone 3, or to locate telecommunication device 2 at a completely different location.

Telecommunication device 2 as shown in FIG. 1 is just an embodiment. For example the power supply of telecommunication device 2 has not been shown, but could be realized by for example using a battery and/or using a mains supply and/or a rectified ringing signal, as of common general knowledge to a person skilled in the art. Further, it should not be excluded that filters 5 and 7 can be avoided or replaced by other units, that further detector 10 detects a voltage-drop in an other way, that threshold establisher 11 can be avoided or replaced by an other unit, that processor 9 is replaced by a unit disclosing a more hardware-character or a more software-character, that memory 6 is more or less integrated with either processor 9 or display 8, etc. In general, telecommunication device 2 will need a detector for detecting a signalling signal (comprising rings and silences), and will need a further detector for detecting a response to an incoming call associated with said signalling signal. In case of telecommunication device 2 and telephone 3 being integrated, with said telephone 3 already comprising said detector for detecting said signalling signal, said telecommunication device 2 could use it too, which is very advantageous.

What is claimed is:

1. Telecommunication device having caller identification functionality and a display for showing the number of a caller comprising:
   an input for receiving a signaling signal comprising a ringing signal and an identification signal,
   a detector coupled to said input for detecting said signaling signal, and
   a further detector coupled to said input for detecting a response to said signaling signal, which response originates from a telephone in a plurality of telephones coupled to said input in a parallel way and which response comprises a voltage drop due to an off-hook situation, wherein said further detector comprises a capacitor which is charged with a charge which depends upon an absence or a presence of said voltage drop, said capacitor charging interval having a longer duration for an answered call and a shorter duration for an unanswered call, wherein a call is detected as answered in the absence of said capacitor charging to a predetermined charge within a measured time interval, and which capacitor is discharged at regular moments which are independent from said charge.

2. Telecommunication device according to claim 1, wherein said capacitor is charged with a first charge in case of said voltage-drop being absent and that said capacitor is charged with a second charge in case of said voltage-drop being present.

3. Telecommunication device according to claim 2, wherein said further detector comprises a threshold establisher coupled to said capacitor for establishing a threshold.

4. Telecommunication device according to claim 3, wherein said further detector comprises a time measurer coupled to said threshold establisher for measuring a time interval for said capacitor being charged up to said threshold.

5. Telecommunication device according to claim 1, wherein said further detector comprises a threshold establisher coupled to said capacitor for establishing a threshold.

6. Telecommunication device according to claim 5, wherein said further detector comprises a time measurer coupled to said threshold establisher for measuring a time interval for said capacitor being charged up to said threshold.

7. Telecommunication device according to claim 2, wherein said further detector comprises a threshold establisher coupled to said capacitor for establishing a threshold.

8. Telecommunication device according to claim 7, wherein said further detector comprises a time measurer coupled to said threshold establisher for measuring a time interval for said capacitor being charged up to said threshold.

9. Telecommunication device according to claim 1, wherein said telecommunication device comprises a memory coupled to said detector and to said further detector for storing said identification signal and said response.

10. Telecommunication device according to claim 9, wherein said telecommunication device comprises a display coupled to said memory for displaying said identification signal and said response.

11. Telecommunication device according to claim 2, wherein said telecommunication device comprises a memory coupled to said detector and to said further detector for storing said identification signal and said response.

12. Telecommunication device according to claim 11, wherein said telecommunication device comprises a display coupled to said memory for displaying said identification signal and said response.

13. Telecommunication device according to claim 3, wherein said telecommunication device comprises a memory coupled to said detector and to said further detector for storing said identification signal and said response.

14. Telecommunication device according to claim 13, wherein said telecommunication device comprises a display coupled to said memory for displaying said identification signal and said response.

15. Telecommunication device according to claim 4, wherein said telecommunication device comprises a memory coupled to said detector and to said further detector for storing said identification signal and said response.

16. Telecommunication device according to claim 15, wherein said telecommunication device comprises a display coupled to said memory for displaying said identification signal and said response.

17. Telecommunication device according to claim 5, wherein said telecommunication device comprises a memory coupled to said detector and to said further detector for storing said identification signal and said response.

18. Telecommunication device according to claim 17, wherein said telecommunication device comprises a display coupled to said memory for displaying said identification signal and said response.

19. Telecommunication device according to claim 7, wherein said telecommunication device comprises a memory coupled to said detector and to said further detector for storing said identification signal and said response.

20. Telecommunication device according to claim 19, wherein said telecommunication device comprises a display coupled to said memory for displaying said identification signal and said response.

* * * * *